United States Patent
An et al.

(10) Patent No.: US 8,789,200 B2
(45) Date of Patent: Jul. 22, 2014

(54) AGENT APPARATUS AND METHOD FOR SHARING ANONYMOUS IDENTIFIER-BASED SECURITY INFORMATION AMONG SECURITY MANAGEMENT DOMAINS

(75) Inventors: Gae-Il An, Daejeon (KR); Dae-Hee Seo, Chungcheongnam-do (KR); Jong-Hyun Kim, Daejeon (KR); Sun-Hee Lim, Seongnam-si (KR); Sungwon Yi, Daejeon (KR); Ki-Young Kim, Daejeon (KR); Dong-Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 110 days.

(21) Appl. No.: 13/493,120

(22) Filed: Jun. 11, 2012

(65) Prior Publication Data

US 2013/0139268 A1    May 30, 2013

(30) Foreign Application Priority Data

Nov. 28, 2011 (KR) ........................ 10-2011-0124760

(51) Int. Cl.
*H04L 29/06* (2006.01)
*H04L 9/32* (2006.01)

(52) U.S. Cl.
USPC .................................. 726/26; 713/179; 726/5

(58) Field of Classification Search
None
See application file for complete search history.

(56) References Cited

U.S. PATENT DOCUMENTS

| | | | |
|---|---|---|---|
| 6,397,224 B1 * | 5/2002 | Zubeldia et al. | 1/1 |
| 6,449,621 B1 * | 9/2002 | Pettovello | 1/1 |
| 6,983,379 B1 * | 1/2006 | Spalink et al. | 705/50 |
| 7,360,251 B2 * | 4/2008 | Spalink et al. | 726/26 |
| 7,404,079 B2 * | 7/2008 | Gudbjartsson et al. | 713/168 |
| 7,472,423 B2 * | 12/2008 | DeCenzo et al. | 726/26 |
| 7,996,912 B2 * | 8/2011 | Spalink et al. | 726/26 |
| 8,285,540 B2 * | 10/2012 | Sato et al. | 704/9 |
| 8,321,952 B2 * | 11/2012 | Spalink et al. | 726/26 |
| 2003/0065562 A1 * | 4/2003 | Matsui et al. | 705/14 |
| 2010/0049687 A1 | 2/2010 | Patten et al. | |
| 2011/0010563 A1 * | 1/2011 | Lee et al. | 713/189 |
| 2011/0078775 A1 * | 3/2011 | Yan | 726/6 |
| 2011/0078779 A1 * | 3/2011 | Liu et al. | 726/9 |
| 2012/0303616 A1 * | 11/2012 | Abuelsaad et al. | 707/736 |
| 2014/0025753 A1 * | 1/2014 | Gronowski et al. | 709/206 |

FOREIGN PATENT DOCUMENTS

| | | |
|---|---|---|
| KR | 10-2003-0015519 A | 2/2003 |
| KR | 10-2007-0117757 A | 12/2007 |

* cited by examiner

*Primary Examiner* — Christopher Revak (57) ABSTRACT

The present invention relates to an agent apparatus and method for sharing anonymous identifier-based security information among security management domains. A plurality of security information sharing agent apparatuses respectively located in a plurality of security management domains and configured to collect security information and transmit collected security information to outside of the security management domains. Each security information sharing agent apparatus includes an identifier conversion unit for converting real name identifier-based security information into anonymous identifier-based security information by converting a real name identifier included in the security information into an anonymous identifier, and a security information communication unit for transmitting the anonymous identifier-based security information obtained by the identifier conversion unit to outside of a corresponding security management domain so that security information is shared among the plurality of security management domains.

12 Claims, 6 Drawing Sheets

AGENT APPARATUS AND METHOD FOR SHARING ANONYMOUS IDENTIFIER-BASED SECURITY INFORMATION AMONG SECURITY MANAGEMENT DOMAINS

CROSS REFERENCE TO RELATED APPLICATIONS

This application claims the benefit of Korean Patent Application No. 10-2011-0124760, filed on Nov. 28, 2011, which is hereby incorporated by reference in its entirety into this application.

BACKGROUND OF THE INVENTION

1. Technical Field

The present invention relates generally to an agent apparatus and method for sharing anonymous identifier-based security information among security management domains and, more particularly, to an agent apparatus and method for sharing anonymous identifier-based security information among security management domains, which enable security management domains, the security information of which is desired to be shared, to share the security information by using hash identifiers, by which personal information can be prevented from being extracted, via a security analysis agent apparatus present in a trustworthy domain, thus effectively protecting personal information included in the shared security information.

2. Description of the Related Art

With the propagation of the Internet, the use of personal Internet banking and electronic commerce has rapidly increased, and services and marketing provided by businesses, the government, and banks have been rapidly popularized based on Internet shopping mall websites, homepages, etc. In this situation, various types of widespread illegal actions are occurring, such as the actions of unfairly obtaining personal information, financial credit information related to credit cards or the like, marketing information or new product development information, or the actions of interrupting large-scale Internet services or causing the situation of services being disabled.

In order to effectively prevent these illegal actions, for example, illegal hacking or cyber attacks such as the distribution of worm/viruses to an unspecified number of the general public, a trusted information sharing network is constructed for security management domains of institutions/companies for providing Internet services. Accordingly, the security management domains of the institutions/companies share security information related to hacking, viruses, worms, cyber terrors, network spies, computer emergency such as information wars, and vulnerability information, with security management domains of other Internet service providers.

Figure 1:
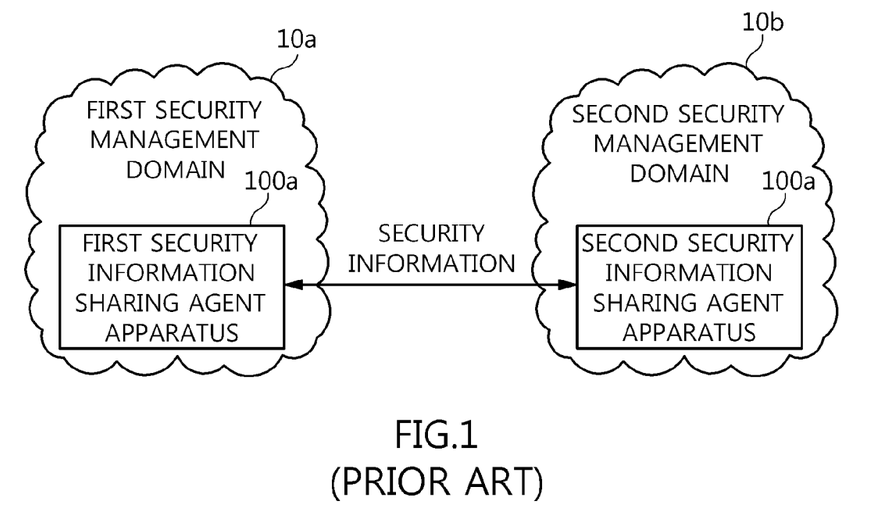
FIG. 1 is a diagram showing a conventional security information sharing system for allowing a plurality of security management domains to mutually share security information collected from their own domains among themselves.

FIG. 1 is a diagram showing a typical security information sharing system for allowing a plurality of security management domains to share security information collected from their own domains among themselves.

As shown in FIG. 1, security management domains 10a and 10b of institution/companies for providing Internet services respectively include security information sharing agent apparatuses 100a and 100b, each collecting security information and transmitting the security information to the other security management domain so as to share the security information with it. Here, as the first security management domain 10a and the second security management domain 10b have mutually agreed to share security information between themselves, the first security information sharing agent apparatus 100a of the first security management domain 10a and the second security information sharing agent apparatus 100b of the second security management domain 10b exchange security information collected from their security management domains via wired/wireless communication, so that the security information is shared between the security management domains 10a and 10b.

Here, the security information (computer emergency information, security log, cyber attack detection information, security vulnerability information, security evaluation information, etc.), collected by the security information sharing agent apparatuses 100a and 100b from the security management domains to which they belong, may include real name identifiers (Internet Protocol (IP) addresses or the like) that enable the identification of individual clients who use the Internet services. When a real name identifier included in security information collected from a specific security management domain is transmitted to another security management domain via the sharing of security information, the privacy of the corresponding client may leak.

Because of problems related to the leakage of the privacy of clients, security information shared among the security management domains was in the past limited to security statistical information that does not contain real name identifiers (the number of cyber attacks per minute, the amount of traffic, the seriousness of cyber attacks, etc.). However, even if pieces of security information that do not contain real name identifiers are shared among security management domains, keys for identifying the security information are not present, so that it is difficult to analyze the association and correlation between pieces of security information, thus making it almost impossible to analyze meaningful security information.

Therefore, there is required the introduction of a security information sharing system that is capable of protecting the personal privacy of clients while sharing security information that includes identifiers among security management domains.

SUMMARY OF THE INVENTION

Accordingly, the present invention has been made keeping in mind the above problems occurring in the prior art, and an object of the present invention is to provide security information sharing technology, in which when a plurality of security management domains share security information such as computer emergency, security log, or security vulnerability information, personal identifiers included in the security information are prevented from being leaked to the outside of the security management domains, thus protecting personal information included in the shared security information.

In accordance with an aspect of the present invention to accomplish the above object, there is provided a security information sharing agent apparatus located in a security management domain and configured to collect security information and transmit collected security information to outside of the security management domain, including an identifier conversion unit for converting real name identifier-based security information into anonymous identifier-based security information by converting a real name identifier included in the security information into an anonymous identifier; and a security information communication unit for transmitting the anonymous identifier-based security information obtained by the identifier conversion unit to outside of a corresponding security management domain so that the security information is shared among a plurality of security management domains.

Preferably, the identifier conversion unit may convert the real name identifier included in the security information into a hash identifier that is the anonymous identifier by using a one-way hash function.

Preferably, an algorithm and a key for the one-way hash function required to convert the real name identifier included in the security information into the hash identifier may be shared among only a plurality of security information sharing agent apparatuses.

Preferably, the security information sharing agent apparatus may further include an identifier mapping information storage unit for storing mapping information between the real name identifier included in the security information and the anonymous identifier resulted from conversion of the real name identifier.

Preferably, the identifier conversion unit may convert an anonymous identifier included in security information analysis results received from a security analysis agent apparatus into a real name identifier by using the mapping information stored in the identifier mapping information storage unit.

In accordance with another aspect of the present invention to accomplish the above object, there is provided a security analysis agent apparatus located in a security analysis domain, including a security information reception unit for receiving pieces of anonymous identifier-based security information from a plurality of security information sharing agent apparatuses respectively located in a plurality of security management domains; a security information analysis unit for analyzing the anonymous identifier-based security information received by the security information reception unit and outputting results of the analysis of the anonymous identifier-based security information; and a security analysis information transmission unit for transmitting the anonymous identifier-based security information analysis results output from the security information analysis unit to the security information sharing agent apparatuses.

Preferably, the security analysis agent apparatus may further include a reception agent apparatus determination unit for determining the security information sharing agent apparatuses to which the anonymous identifier-based security information analysis results are to be transmitted.

Preferably, the security analysis agent apparatus may further include an identifier source storage unit for storing mapping information between anonymous identifiers included in security information received from the security information sharing agent apparatuses and corresponding security information sharing agent apparatuses that transmitted the security information including the anonymous identifiers.

Preferably, the reception agent apparatus determination unit may determine the security information sharing agent apparatuses to which the anonymous identifier-based security information analysis results are to be transmitted by using the mapping information stored in the identifier source storage unit so that security information analysis results obtained by analyzing the security information including the anonymous identifiers are transmitted to the corresponding security information sharing agent apparatuses that transmitted the security information including the anonymous identifiers.

Preferably, the reception agent apparatus determination unit may classify the security information analysis results for respective anonymous identifiers and searches the mapping information stored in the identifier source storage unit for security information sharing agent apparatuses that transmitted the security information including the anonymous identifiers, thus determining the security information sharing agent apparatuses to which the anonymous identifier-based security information analysis results are to be transmitted.

In accordance with a further aspect of the present invention to accomplish the above object, there is provided a security information sharing method for sharing security information among a plurality of security management domains, including converting, by each of a plurality of security information sharing agent apparatuses respectively located in a plurality of security management domains, a real name identifier included in security information about a corresponding security management domain into an anonymous identifier; transmitting, by the security information sharing agent apparatus, anonymous identifier-based security information to a security analysis agent apparatus; analyzing, by the security analysis agent apparatus, the anonymous identifier-based security information received from the security information sharing agent apparatus; and transmitting, by the security analysis agent apparatus, results of the analysis of the anonymous identifier-based security information to the security information sharing agent apparatus.

Preferably, the converting the real name identifier into the anonymous identifier may be configured to convert the real name identifier included in the security information into a hash identifier that is the anonymous identifier by using a one-way hash function.

Preferably, an algorithm and a key for the one-way hash function required to convert the real name identifier included in the security information into the hash identifier may be shared among only the security information sharing agent apparatuses.

Preferably, the security information sharing method may further include storing, by the security information sharing agent apparatus, mapping information between the real name identifier included in the security information and the anonymous identifier resulted from conversion of the real name identifier.

Preferably, the security information sharing method may further include converting, by the security information sharing agent apparatus, an anonymous identifier included in security information analysis results received from the security analysis agent apparatus into a real name identifier by using the mapping information between the real name identifier included in the security information and the anonymous identifier resulted from conversion of the real name identifier.

Preferably, the security information sharing method may further include determining, by the security analysis agent apparatus, a security information sharing agent apparatus to which the anonymous identifier-based security information analysis results are to be transmitted.

Preferably, the security information sharing method may further include storing, by the security analysis agent apparatus, mapping information between anonymous identifiers included in security information, received from respective security information sharing agent apparatuses, and corresponding security information sharing agent apparatuses that transmitted the security information including the anonymous identifiers.

Preferably, the determining the security information sharing agent apparatus may be configured such that the security analysis agent apparatus determines the security information sharing agent apparatus to which the anonymous identifier-based security information analysis results are to be transmitted by using the mapping information between the anonymous identifiers included in the security information, received from the security information sharing agent apparatuses, and the corresponding security information sharing agent apparatuses that transmitted the security information including the anonymous identifiers so that the security information analysis results obtained by analyzing the security information including the anonymous identifiers are transmitted to the corresponding security information sharing agent apparatuses that transmitted the security information including the anonymous identifiers.

Preferably, the determining the security information sharing agent apparatus may comprise classifying the security information analysis results for respective anonymous identifiers and searching the stored mapping information for security information sharing agent apparatuses that transmitted the security information including the anonymous identifiers.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, the configuration and operation of a security information sharing system for sharing security information among a plurality of security management domains according to an embodiment of the present invention will be described with reference to the attached drawings.

Figure 2:
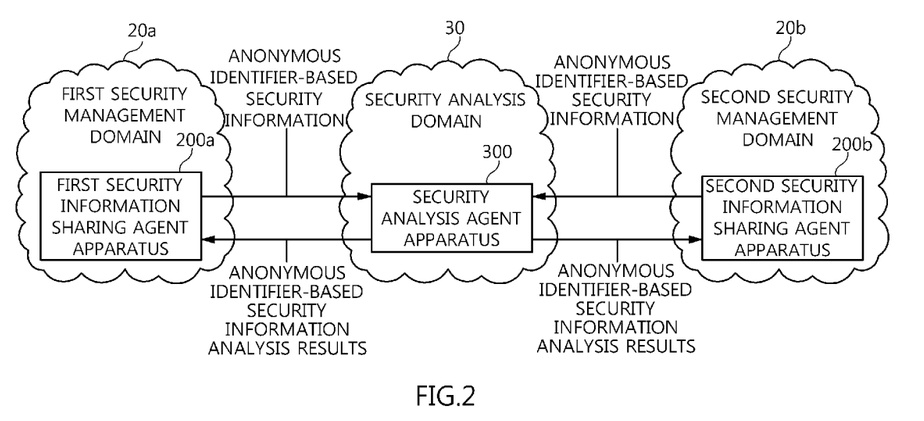
FIG. 2 is a diagram showing the concept of a security information sharing system according to the present invention.

FIG. 2 is a diagram showing the concept of a security information sharing system for sharing security information among a plurality of security management domains according to the present invention.

Referring to FIG. 2, the security information sharing system for sharing security information among a plurality of security management domains according to the present invention includes security information sharing agent apparatuses 200a and 200b respectively located in security management domains 20a and 20b for sharing security information, and a security analysis agent apparatus 300 located in a security analysis domain 30. In this case, it is preferable that the security analysis domain 30 in which the security analysis agent apparatus 300 is located be a domain that can be trusted by all of the security management domains 20a and 20b. For the convenience of description, only two security information sharing agent apparatuses are illustrated in FIG. 2, but the number of security information sharing agent apparatuses is not limited thereto in the security information sharing system according to the present invention.

The first security information sharing agent apparatus 200a located in the first security management domain 20a does not directly communicate with the second security information sharing agent apparatus 200b located in the second security management domain 20b, but indirectly shares security information collected from the security management domain to which it belongs, only via the security analysis agent apparatus 300 located in the trustworthy security analysis domain 30. In this case, when desiring to transmit the security information collected from the first security management domain 20a to the security analysis agent apparatus 300, and a real name identifier (an IP address or the like) that is personally identifiable information is included in the security information, the first security information sharing agent apparatus 200a converts the security information from real name identifier-based security information into anonymous identifier-based security information by converting the real name identifier into an anonymous identifier that is non-personally identifiable information, and then transmits the anonymous identifier-based security information to the security analysis agent apparatus 300. Similarly, when desiring to transmit the security information collected from the second security management domain 20b to the security analysis agent apparatus 300, and a real name identifier (an IP address or the like) that is personally identifiable information is included in the security information, the second security information sharing agent apparatus 200b converts the security information from real name identifier-based security information into anonymous identifier-based security information by converting the real name identifier into an anonymous identifier that is non-personally identifiable information, and then transmits the anonymous identifier-based security information to the security analysis agent apparatus 300. Further, the security analysis agent apparatus 300 that received the pieces of anonymous identifier-based security information from the first and second security information sharing agent apparatuses 200a 200b transmits the results of the analysis of anonymous identifier-based security information, obtained by processing/analyzing the pieces of anonymous identifier-based security information in manners required by the corresponding security information sharing agent apparatuses, to the first and second security information sharing agent apparatuses 200a and 200b, respectively.

Figure 3:
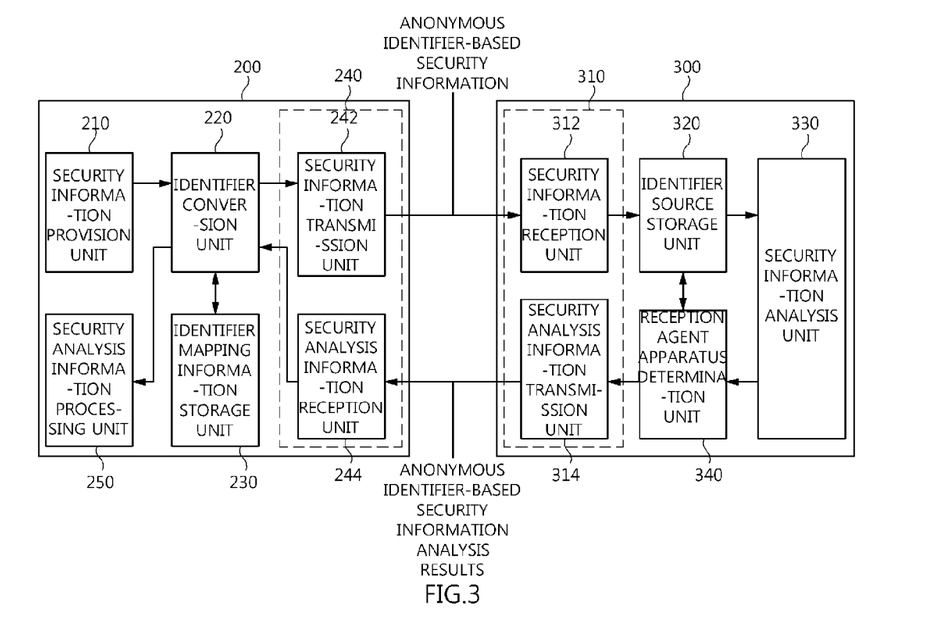
FIG. 3 is a block diagram showing the respective configurations of the security information sharing agent apparatus and the security analysis agent apparatus of the security information sharing system according to the present invention.

FIG. 3 is a block diagram showing the respective configurations of the security information sharing agent apparatus and the security analysis agent apparatus of the security information sharing system for sharing security information among the plurality of security management domains according to the present invention.

Referring to FIG. 3, the security information sharing agent apparatus 200 of the security information sharing system for sharing security information among the plurality of security management domains according to the present invention includes a security information provision unit 210, an identifier conversion unit 220, an identifier mapping information storage unit 230, a security information communication unit 240, and a security analysis information processing unit 250.

The security information provision unit 210 collects security information about a security management domain to which the security information sharing agent apparatus 200 belongs, and transmits the collected security information to the identifier conversion unit 220.

The identifier conversion unit 220 is configured to, when a real name identifier that is personally identifiable information is included in the security information received from the security information provision unit 210, convert the real name identifier into an anonymous identifier that is non-personally identifiable information, and transmit the resulting anonymous identifier-based security information to the security information communication unit 240.

The conversion from the real name identifier that is personally identifiable information into the anonymous identifier that is non-personally identifiable information may be performed by using a hash function. The hash function used for conversion into the anonymous identifier is a one-way function having no inverse function, and conforms to 'H (real name identifier|key)=hash identifier.' The identifier conversion unit 220 converts the real name identifier included in the security information into the anonymous identifier that is a hash identifier by using a hash function by which an input value cannot be calculated from the resulting value. Then, the security information sharing agent apparatus 200 transmits the anonymous identifier-based security information to the security analysis agent apparatus 300. Accordingly, the security information sharing agent apparatus 200 and the security analysis agent apparatus 300 share the anonymous identifier-based security information with each other, thus solving the problem of personal privacy leaks. In this case, preferably, an algorithm and a key for the hash function required to convert a real name identifier into a hash identifier that is an anonymous identifier in the identifier conversion unit 220 are the same in all security information sharing agent apparatuses except for the security analysis agent apparatus 300. It is apparent that, in the following description, an anonymous identifier may refer to a hash identifier, and of course, an anonymous identifier described in the accompanying claims may also refer to a hash identifier.

Further, the identifier conversion unit 220 is configured to, when the security analysis information reception unit 244 of the security information sharing agent apparatus 200 receives the results of the analysis of anonymous identifier-based security information from the security analysis agent apparatus 300, convert the anonymous identifier included in the security information analysis results into a real name identifier by using mapping information between real name identifiers and anonymous identifiers, which has been stored in the identifier mapping information storage unit 230.

The identifier mapping information storage unit 230 is configured to, if the identifier conversion unit 220 converts the real name identifier included in the security information into the anonymous identifier, store mapping information between the real name identifier and the anonymous identifier.

The security information communication unit 240 includes a security information transmission unit 242 for transmitting the anonymous identifier-based security information obtained by the identifier conversion unit 220 to the security analysis agent apparatus 300, and the security analysis information reception unit 244 for receiving the anonymous identifier-based security information analysis results from the security analysis agent apparatus 300. Accordingly, the security information communication unit 240 allows anonymous identifier-based security information and the analysis results thereof to be exchanged between the security information sharing agent apparatus 200 and the security analysis agent apparatus 300.

The security analysis information processing unit 250 is configured to, if the anonymous identifier-based security information analysis results received from the security analysis agent apparatus 300 have been converted by the identifier conversion unit 220 into real name identifier-based security information analysis results, process the real name identifier-based security information analysis results.

Meanwhile, referring to FIG. 3, the security analysis agent apparatus 300 of the security information sharing system for sharing security information among the plurality of security management domains according to the present invention includes a security information analysis result communication unit 310, an identifier source storage unit 320, a security information analysis unit 330, and a reception agent apparatus determination unit 340.

The security information analysis result communication unit 310 includes a security information reception unit 312 for receiving pieces of anonymous identifier-based security information from the security information sharing agent apparatus 200, and a security analysis information transmission unit 314 for transmitting security information analysis results, obtained by analyzing the anonymous identifier-based security information received via the security information reception unit 312, to the security information sharing agent apparatus 200. Then, the security information analysis result communication unit 310 allows the anonymous identifier-based security information and the analysis results thereof to be exchanged between the security information sharing agent apparatus 200 and the security analysis agent apparatus 300.

The identifier source storage unit 320 extracts an anonymous identifier from the anonymous identifier-based security information received from security information sharing agent apparatus 200 via the security information reception unit 312 of the security information analysis result communication unit 310, and stores mapping information between the extracted anonymous identifiers and corresponding security information sharing agent apparatuses that transmitted the anonymous identifier-based security information.

The security information analysis unit 330 analyzes the anonymous identifier-based security information received from the security information sharing agent apparatuses via the security information reception unit 312 of the security information analysis result communication unit 310 and then derives the analysis results of the anonymous identifier-based security information. The security information analysis unit 330 normalizes various types of security information so that they can be searched and processed based on various types of classification, arranges the normalized information into a database (DB), and applies data mining or a knowledge-based analysis algorithm to the security information, thus deriving the results of the analysis of security information such as the analysis of propagation paths, principal distribution time, main attackers, attack types, analyzable pattern information, and dangerous grade-based actions for worms or viruses.

The reception agent apparatus determination unit 340 determines to which of security information sharing agent apparatuses the anonymous identifier-based security information analysis results derived by the security information analysis unit 330 are to be transmitted. In detail, the reception agent apparatus determination unit 340 classifies the anonymous identifier-based security information analysis results, derived by the security information analysis unit 330, for respective anonymous identifiers, searches the mapping information stored in the identifier source storage unit 320 for security information sharing agent apparatuses that transmitted pieces of security information including the respective anonymous identifiers, and determines to transmit only corresponding anonymous identifier-based security information analysis results to the found security information sharing agent apparatuses.

Hereinafter, a security information sharing method for sharing security information among a plurality of security management domains according to the present invention will be described.

Figure 4:
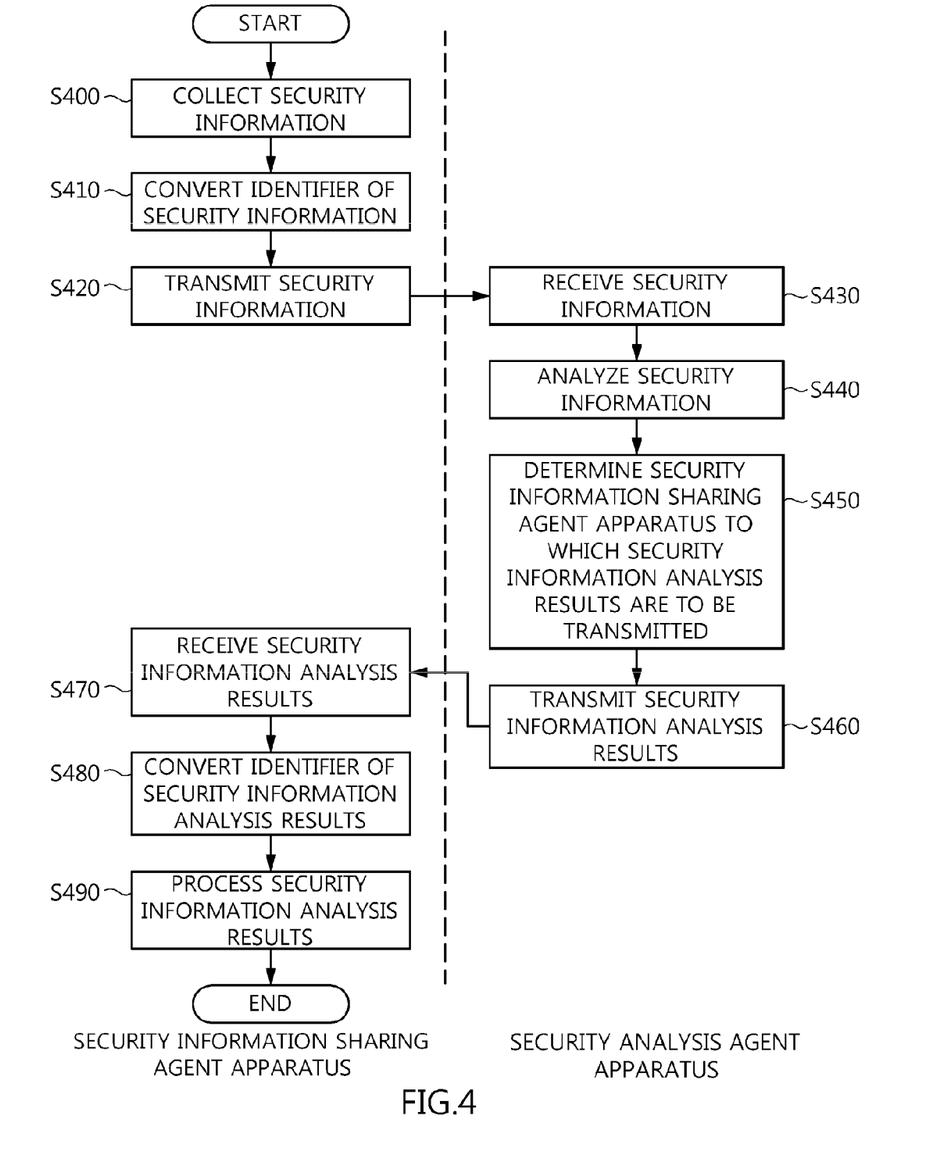
FIG. 4 is a flowchart showing a security information sharing method for sharing security information among a plurality of security management domains according to the present invention.

FIG. 4 is a flowchart showing a security information sharing method for sharing security information among a plurality of security management domains according to the present invention.

Referring to FIG. 4, in the security information sharing method for sharing security information among the plurality of security management domains according to the present invention, the security information provision unit 210 of the security information sharing agent apparatus 200 collects security information about a security management domain to which it belongs at step S400.

Next, the identifier conversion unit 220 of the security information sharing agent apparatus 200 converts a real name identifier included in the security information collected by the security information provision unit 210 into an anonymous identifier that is non-personally identifiable information at step S410. The security information transmission unit 242 transmits security information based on the anonymous identifier obtained by the identifier conversion unit 220 to the security information reception unit 312 of the security analysis agent apparatus 300 at step S420.

Meanwhile, the security information reception unit 312 of the security analysis agent apparatus 300 receives the anonymous identifier-based security information from the security information transmission unit 242 of the security information sharing agent apparatus 200 at step S430. The security information analysis unit 330 analyzes the anonymous identifier-based security information received by the security information reception unit 312, and then derives the results of the analysis of the anonymous identifier-based security information at step S440.

Next, the reception agent apparatus determination unit 340 of the security analysis agent apparatus 300 determines which information of the anonymous identifier-based security information analysis results derived by the security information analysis unit 330 is to be transmitted and to which of security information sharing agent apparatuses 200 the determined information is to be transmitted at step S450. The security analysis information transmission unit 314 transmits the corresponding anonymous identifier-based security information analysis results to the security information sharing agent apparatus 200, determined at step S450, at step S460.

In this case, the security analysis information reception unit 244 of the security information sharing agent apparatus 200 receives anonymous identifier-based security information analysis results from the security analysis information transmission unit 314 of the security analysis agent apparatus 300 at step S470, and transmits the received analysis results to the identifier conversion unit 220.

The identifier conversion unit 220 converts an anonymous identifier included in the received anonymous identifier-based security information analysis results into a real name identifier at step S480. The security analysis information processing unit 250 processes security information analysis results based on the real name identifier at step S490.

Figure 5:
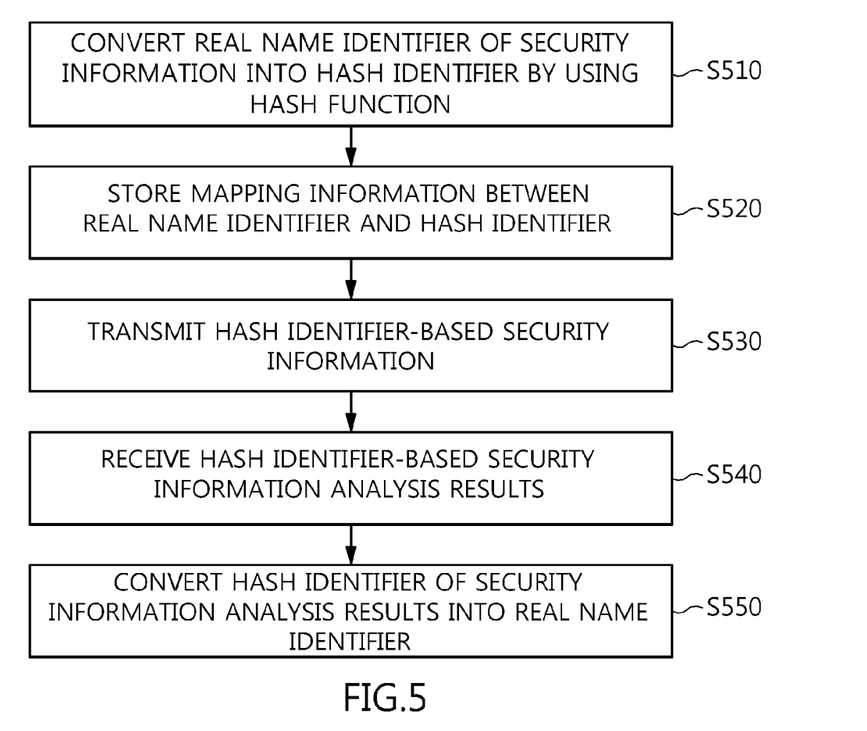
FIG. 5 is a flowchart showing in detail a process in which the security information sharing agent apparatus performs the security information sharing method according to the present invention.

FIG. 5 is a flowchart showing in detail a process in which the security information sharing agent apparatus performs the security information sharing method for sharing security information among the plurality of security management domains according to the present invention.

Referring to FIG. 5, the security information sharing agent apparatus 200 of the present invention determines, using the identifier conversion unit 220, whether a real name identifier (an IP address or the like) that is personally identifiable information is included in security information collected from a security management domain to which the security information sharing agent apparatus 200 belongs, and if it is determined that the real name identifier is included in the collected security information, converts the real name identifier into a hash identifier that is an anonymous identifier being non-personally identifiable information by using a one-way hash function at step S510.

Next, the security information sharing agent apparatus 200 stores mapping information between the real name identifier included in the security information and the hash identifier resulted from conversion of the corresponding real name identifier in the identifier mapping information storage unit 230 at step S520, and thereafter transmits hash identifier-based security information to the security analysis agent apparatus 300 at step S530.

Next, the security information sharing agent apparatus 200 receives hash identifier-based security information analysis results, obtained by analyzing the hash identifier-based security information, from the security analysis agent apparatus 300 at step S540. The security information sharing agent apparatus 200 converts the hash identifier included in the received security information analysis results into a real name identifier by using mapping information between real name identifiers and hash identifiers which is stored in the identifier mapping information storage unit 230 at step S550, and then converts hash identifier-based security information analysis results into real name identifier-based security information analysis results.

Figure 6:
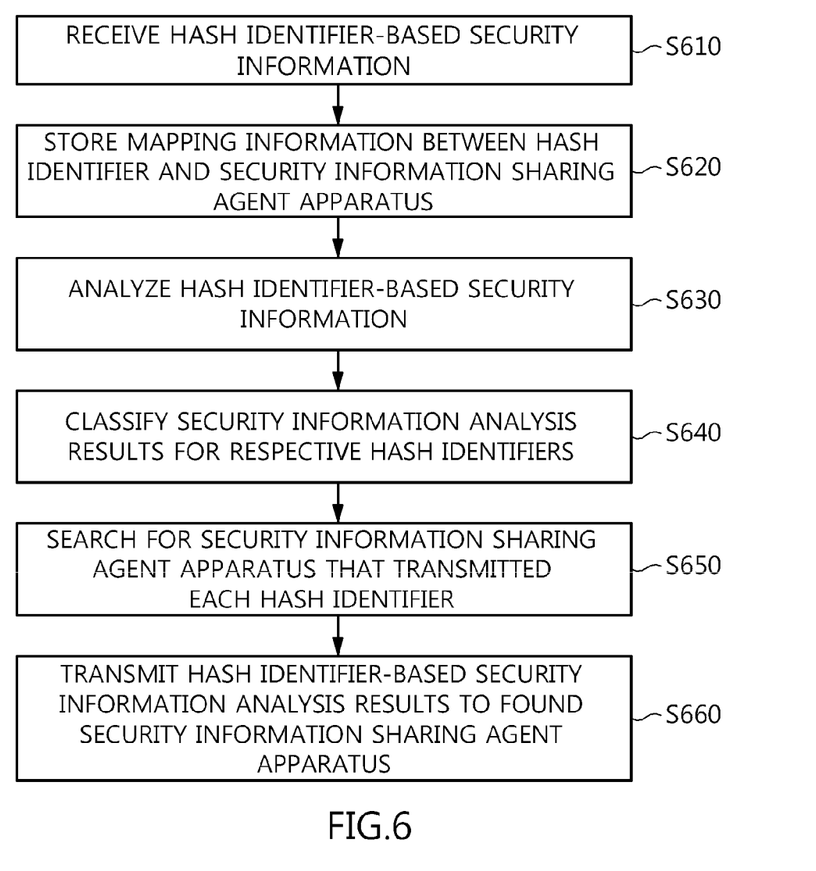
FIG. 6 is a flowchart showing in detail a process in which the security analysis agent apparatus performs the security information sharing method according to the present invention.

FIG. 6 is a flowchart showing in detail a process in which the security analysis agent apparatus performs the security information sharing method for sharing security information among the plurality of security management domains according to the present invention.

Referring to FIG. 6, the security analysis agent apparatus 300 of the present invention receives hash identifier-based security information from each security information sharing agent apparatus 200 at step S610, and stores mapping information between the corresponding hash identifier and the security information sharing agent apparatus 200 that transmitted the hash identifier-based security information in the identifier source storage unit 320 at step S620.

Next, the security analysis agent apparatus 300 analyzes the hash identifier-based security information by using the security information analysis unit 330, and then derives the results of the analysis of the hash identifier-based security information at step S630. Further, the security analysis agent apparatus 300 classifies the hash identifier-based security information analysis results derived at step S630 for respective hash identifiers by using the reception agent apparatus determination unit 340 at step S640, and searches the mapping information stored in the identifier source storage unit 320 for a security information sharing agent apparatus 200 that transmitted the security information based on each hash identifier at step S650.

Finally, the security analysis agent apparatus 300 transmits the corresponding hash identifier-based security information analysis results to the security information sharing agent apparatus 200, found at step S650, at step S660.

According to the present invention, security information sharing agent apparatuses, which desire to share security information, share the security information among themselves by using hash-based identifiers, by which personal information can be prevented from being extracted, via a security analysis agent apparatus present in a trustworthy domain, thus preventing personal information included in shared security information from being leaked to the outside.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A security information sharing agent apparatus located in a security management domain and configured to collect security information and transmit collected security information to outside of the security management domain, comprising:
   an identifier conversion unit for converting real name identifier-based security information into anonymous identifier-based security information by converting a real name identifier included in the security information into an anonymous identifier included in the anonymous identifier-based security information;
   a security information communication unit for transmitting, to outside of the security management domain, the anonymous identifier-based security information produced by the identifier conversion unit; and
   an identifier mapping information storage unit for storing mapping information between the real name identifier and the anonymous identifier,
   wherein when a security information analysis result includes the anonymous identifier, the identifier conversion unit converts the anonymous identifier into the real name identifier using the mapping information.

2. The security information sharing agent apparatus of claim 1, wherein the identifier conversion unit converts the real name identifier included in the security information into a hash identifier that is the anonymous identifier by using a one-way hash function.

3. The security information sharing agent apparatus of claim 2, wherein an algorithm and a key for the one-way hash function required to convert the real name identifier included in the security information into the hash identifier are shared among only a plurality of security information sharing agent apparatuses.

4. A security analysis agent apparatus located in a security analysis domain, comprising:
   a security information reception unit for receiving anonymous identifier-based security information from a plurality of security information sharing agent apparatuses respectively located in a plurality of security management domains;
   a security information analysis unit for analyzing the anonymous identifier-based security information received by the security information reception unit and outputting results of the analysis of the anonymous identifier-based security information;
   a security analysis information transmission unit for transmitting the anonymous identifier-based security information analysis results output from the security information analysis unit to the security information sharing agent apparatuses;
   an identifier source storage unit for storing mapping information between anonymous identifiers included in security information received from the security information sharing agent apparatuses and the respective originating security information sharing agent apparatuses thereof; and
   a reception agent apparatus determination unit for determining the security information sharing agent apparatuses to which the anonymous identifier-based security information analysis results are to be transmitted according to the mapping information stored in the identifier source storage unit.

5. The security analysis agent apparatus of claim 4, wherein the reception agent apparatus determination unit classifies the security information analysis results for respective anonymous identifiers and searches the mapping information stored in the identifier source storage unit for security information sharing agent apparatuses that transmitted the security information including the anonymous identifiers, thus determining the security information sharing agent apparatuses to which the anonymous identifier-based security information analysis results are to be transmitted.

6. A security information sharing method for sharing security information among a plurality of security management domains, comprising:
   converting, by a security information sharing agent apparatus located in a security management domain, a real name identifier included in security information about the security management domain into an anonymous identifier;
   storing, by the security information sharing agent apparatus, mapping information between the real name identifier and the anonymous identifier;
   transmitting, by the security information sharing agent apparatus, anonymous identifier-based security information to a security analysis agent apparatus, the anonymous identifier-based security information including the anonymous identifier;
   analyzing, by the security analysis agent apparatus, the anonymous identifier-based security information received from the security information sharing agent apparatus;
   transmitting, by the security analysis agent apparatus, a result of the analysis of the anonymous identifier-based security information to the security information sharing agent apparatus, the result including the anonymous identifier; and
   converting, by the security information sharing agent apparatus using the mapping information, the anonymous identifier included in the result into the real name identifier.

7. The security information sharing method of claim 6, wherein the converting the real name identifier into the anonymous identifier is configured to convert the real name identifier included in the security information into a hash identifier that is the anonymous identifier by using a one-way hash function.

8. The security information sharing method of claim 7, wherein an algorithm and a key for the one-way hash function required to convert the real name identifier included in the security information into the hash identifier are shared among only the security information sharing agent apparatuses.

9. The security information sharing method of claim 6, further comprising:

determining, by the security analysis agent apparatus, a security information sharing agent apparatus to which the result is to be transmitted.

10. The security information sharing method of claim 9, further comprising:

storing, by the security analysis agent apparatus, mapping information between anonymous identifiers included in security information, received from respective security information sharing agent apparatuses, and corresponding security information sharing agent apparatuses that transmitted the security information including the anonymous identifiers.

11. The security information sharing method of claim 10, wherein determining the security information sharing agent apparatus to which the result is to be transmitted includes using the mapping information, so that the result is transmitted to the corresponding security information sharing agent apparatus that transmitted the security information including the anonymous identifier included in the result.

12. The security information sharing method of claim 11, wherein the determining the security information sharing agent apparatus comprises classifying the security information analysis results for respective anonymous identifiers and searching the stored mapping information for security information sharing agent apparatuses that transmitted the security information including the anonymous identifiers.

* * * * *